United States Patent
Liao et al.

(10) Patent No.: US 7,240,232 B2
(45) Date of Patent: Jul. 3, 2007

(54) CONNECTION DEVICE CAPABLE OF CONVERTING A PIXEL CLOCK TO A CHARACTER CLOCK

(75) Inventors: Ira Liao, Taipei Hsien (TW); Lizst Hsu, Taipei Hsien (TW); Stam Chuang, Taipei Hsien (TW)

(73) Assignee: VIA Technologies Inc., Hsin-Tien, Taipei Hsien (TW)

( * ) Notice: Subject to any disclaimer, the term of this patent is extended or adjusted under 35 U.S.C. 154(b) by 273 days.

(21) Appl. No.: 10/711,508

(22) Filed: Sep. 23, 2004

(65) Prior Publication Data

US 2005/0140667 A1 Jun. 30, 2005

Related U.S. Application Data

(60) Provisional application No. 60/481,801, filed on Dec. 16, 2003.

(51) Int. Cl.
- G06F 1/00 (2006.01)
- G09G 5/02 (2006.01)
- G09G 5/00 (2006.01)

(52) U.S. Cl. .......... 713/500; 345/698; 345/3.3
(58) Field of Classification Search ........ 713/500; 345/698, 3.3
See application file for complete search history.

(56) References Cited

U.S. PATENT DOCUMENTS

| 4,737,772 | A | | 4/1988 | Nishi et al. |
|---|---|---|---|---|
| 5,544,202 | A | | 8/1996 | Jackson et al. |
| 5,640,465 | A | * | 6/1997 | Smitt .......... 382/172 |
| 5,671,069 | A | | 9/1997 | Kodama |
| 6,041,093 | A | * | 3/2000 | Cho ............ 377/47 |
| 6,469,748 | B1 | | 10/2002 | Sato |
| 6,535,217 | B1 | | 3/2003 | Chih et al. |
| 6,573,905 | B1 | | 6/2003 | MacInnis et al. |
| 6,686,780 | B2 | * | 2/2004 | Kimura et al. ........ 327/115 |
| 6,738,417 | B1 | | 5/2004 | Kim et al. |
| 6,867,781 | B1 | | 3/2005 | Van Hook et al. |
| 6,900,845 | B1 | | 5/2005 | Christopher et al. |
| 6,956,922 | B2 | * | 10/2005 | Weldon et al. ....... 375/373 |
| 2003/0206180 | A1 | | 11/2003 | Ehlers et al. |

* cited by examiner

*Primary Examiner*—Chun Cao
*Assistant Examiner*—Ji H. Bae
(74) *Attorney, Agent, or Firm*—Winston Hsu

(57) ABSTRACT

A connection device capable of converting a pixel clock to a character clock comprises a pixel generator, a frequency divider, and a logic unit. The pixel generator generates a pixel clock having a number of cycles that is not an integer multiple of a first number during a predetermined interval. The frequency divider connected to the pixel clock generator generates a character clock according to the pixel clock. The logic unit connected to the pixel clock generator and the frequency divider is used for controlling the frequency divider to generate the character clock by dividing the number of cycles of the pixel clock during part of the predetermined interval by the first number and by dividing the number of cycles of the pixel clock during the remaining part of the predetermined interval by a second number.

6 Claims, 4 Drawing Sheets

CONNECTION DEVICE CAPABLE OF CONVERTING A PIXEL CLOCK TO A CHARACTER CLOCK

CROSS REFERENCE TO RELATED APPLICATIONS

This application claims the benefit of U.S. Provisional Application No. 60/481,801, filed Dec. 16, 2003, and included herein by reference.

BACKGROUND OF INVENTION

1. Field of the Invention

The present invention relates to a connection device, and more particularly, to a connection device capable of converting a pixel clock to a character clock.

2. Description of the Prior Art

Please refer to FIG. 1. FIG. 1 is a diagram of a prior art connection device 100. A pixel clock generator 130 generates a pixel clock (PCK) having a number of cycles that is an integer multiple of a predetermined number during a predetermined interval and outputs the PCK to a frequency divider 140. The frequency divider 140 generates a character clock (CCK) according to the PCK output by the pixel clock generator 130 and outputs the CCK to a time control module 120. A logic unit 110 controls a second counter 122 of the time control module 120 so that the second counter 122 controls when a control signal (HSync, VSync, etc.) changes its state (from low level L to high level H or from high level H to low level L) based on the CCK output by the frequency divider 140.

Generally, the character clock controls images displayed on a display. A cycle of the character clock spans eight or nine cycles of the pixel clock (1 CCK cycle=8 or 9 PCK cycles). Therefore, the duration of a cycle of the CCK generated by the frequency divider 140 is eight or nine times that of the PCK.

Suppose that a cycle of the CCK corresponds to eight cycles of the PCK. Please refer to FIG. 2. FIG. 2 shows the CCK state and the PCK state during a predetermined interval. A first counter 142 of the frequency divider 140 counts from 0 to 7 (CNT_PCK is from 0 to 7) continuously. When the values of CNT_PCK are 0, 1, 2, and 3, the CCK is at level H. Otherwise, the CCK is at level L. Therefore, a cycle of the CCK spans eight cycles of the PCK, as shown in FIG. 2. In other words, the frequency divider 140 generates the CCK of FIG. 2 according to the PCK and the value of CNT_PCK.

Please refer to FIG. 3. FIG. 3 shows a control signal and the CCK of FIG. 2. In FIG. 3, consider HSync as the control signal. After time T3 ends and when time T1 starts, the display signal rises from level L to level H so that the screen starts to display images. Before the end of time T1, the display signal drops from level H to level L. When time T1 ends, the control signal HSync rises from level L to level H. The control signal drops from level H to level L when time T2 ends. Note that each duration T1, T2 and T3 is an integer multiple of the CCK. The CCK is generated by the frequency divider 140 of FIG. 1, and a cycle of the CCK is eight time that of the PCK. In FIG. 1, the second counter 122 of the time control module 120 controls the time control module 120 to generate the HSync shown in FIG. 3 according to the CCK output by the frequency divider 140. Then the HSync controls the horizontal scanning of the screen. Note that the horizontal scanning controlled by the HSync signal differs among different manufactures and for different resolutions. For instance, the horizontal scanning is controlled by HSync signal dropping from level H to level L or increasing from level L to level H.

Control signals control the scanning of the display or TV screen when images are displayed. The clock unit of the control signals is one cycle of the CCK, which equals eight or nine cycles of the PCK. That is, such control signals only control screens having horizontal resolutions evenly divisible by eight or nine. However, there are TV screens with high resolutions, such as high definition televisions (HDTV). According to the video electronics standards association (VESA), standard resolutions are 2200×1100, 2640×1320, and 2750×1375 pixels. The horizontal resolution of the resolution 2750×1375, i.e. 2750, is not evenly divisible by eight or nine. Therefore, the prior art connection device 100 cannot control such screens.

SUMMARY OF INVENTION

It is therefore a primary objective of the claimed invention to provide a connection device capable of converting a pixel clock to a character clock to solve the above-mentioned problems.

The claimed invention discloses a connection device capable of converting a pixel clock to a character clock. The connection device comprises a pixel generator, a frequency divider, and a logic unit. The pixel generator generates a pixel clock having a number of cycles that is not an integer multiple of a first number during a predetermined interval. The frequency divider connected to the pixel clock generator generates a character clock according to the pixel clock. The logic unit connected to the pixel clock generator and the frequency divider is used for controlling the frequency divider to generate the character clock by dividing the number of cycles of the pixel clock during part of the predetermined interval by the first number and by dividing the number of cycles of the pixel clock during the remaining part of the predetermined interval by a second number.

These and other objectives of the present invention will no doubt become obvious to those of ordinary skill in the art after reading the following detailed description of the preferred embodiment that is illustrated in the various figures and drawings.

DETAILED DESCRIPTION

Figure 4:
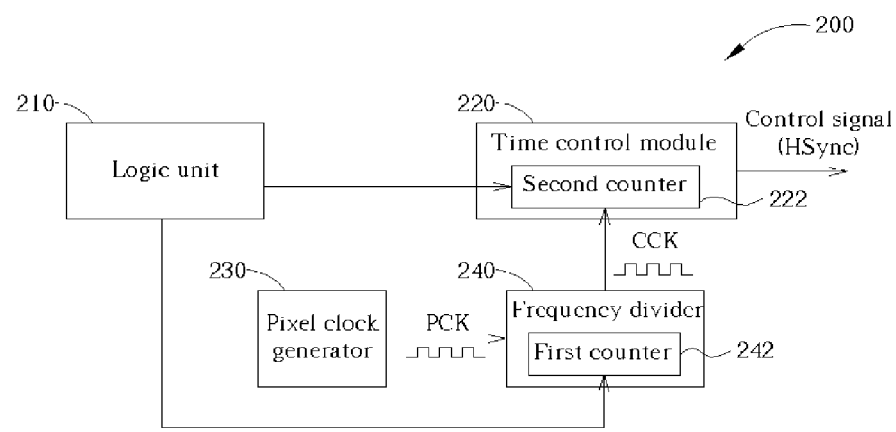
FIG. 4 is a diagram of a present invention connection device.

In order to describe the present invention, suppose that a cycle of a character clock CCK spans eight cycles of a pixel clock PCK, and that the horizontal resolution of a screen is not evenly divisible by eight. Please refer to FIG. 4. FIG. 4 is a diagram of a present invention connection device 200. The connection device 200 can control screens with horizontal resolution not evenly divisible by eight, which the prior art connection device 100 cannot. A logic unit 210 controls a second counter 222 of a time control module 220 and a first counter 242 of a frequency divider 240 according to a resolution. The logic unit 210 controls the second counter 222 of the time control module 220 the same as in the prior art, and redundant details are omitted. The logic unit 210 controls the first counter 242 of the frequency divider 240 to generate the CCK for resolutions not evenly divisible by eight. A resolution not evenly divisible by eight means that the number of cycles of the PCK during a predetermined interval is not evenly divisible by eight. Therefore, the logic unit 210 divides the PCK during the predetermined interval into two parts according to the number of cycles of the PCK during the predetermined interval. One part is evenly divisible by eight and the remaining part is not evenly divisible by eight. Then the logic unit 210 controls the first counter 242 of the frequency divider 240 to generate the CCK according to the two parts.

Figure 1:
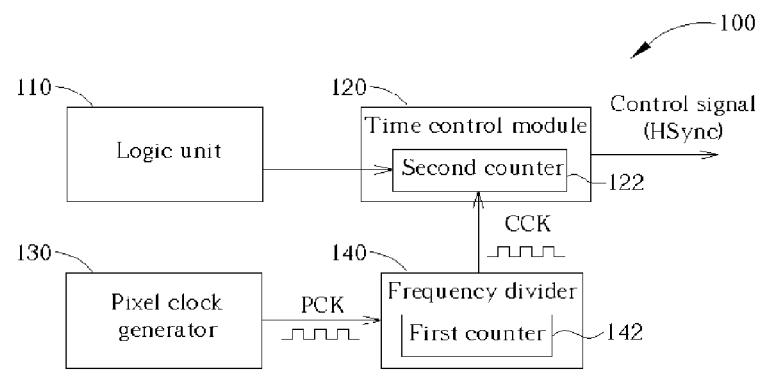
FIG. 1 is a diagram of a prior art connection device.
Figure 2:
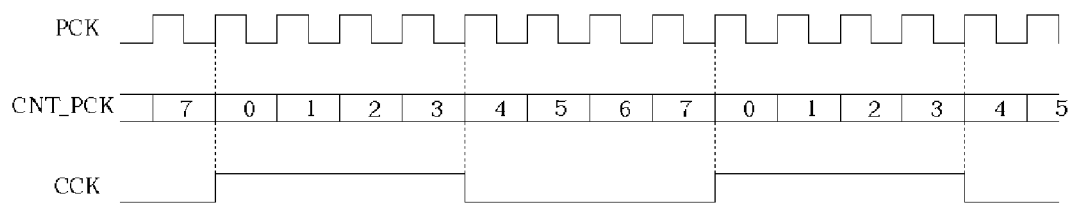
FIG. 2 shows the prior art CCK and PCK states during a predetermined interval.
Figure 5:
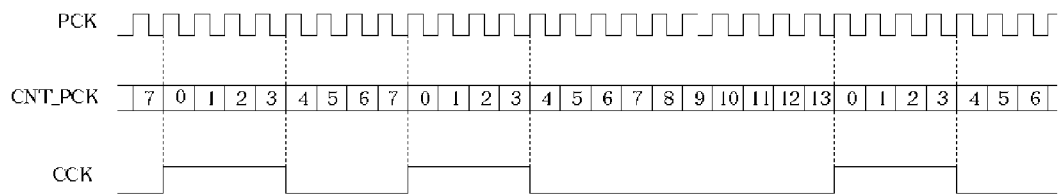
FIG. 5 shows the present invention CCK and PCK during the predetermined interval.

Please refer to FIG. 5. FIG. 5 shows that the CCK and the PCK are not evenly divisible by eight during the predetermined interval. Suppose that when the value of CNT_PCK of the first counter 242 is 0, 1, 2, and 3, the CCK is at high level H. Otherwise, the CCK is at low level L. When processing the PCK during the predetermined interval, the value of CNT_PCK of the first counter 242 repeats cyclically from 0 to 7 to generate a plurality of cycles of the CCK of FIG. 2. An extended clock is inserted to a certain cycle of the CCK. The length of the extended clock is generated according to the remainder obtained from the number of cycles of the PCK divided by eight. The cycle of the CCK having the extended clock is the part not evenly divisible by eight and divided by the logic unit 210. The remaining part of the PCK is evenly divisible by eight.

For instance, suppose that the resolution of a screen is 2750×1375 pixels. When 2750 is divided by 8, the quotient is 343 and the remainder is 6. The logic unit 210 divides the PCK during the predetermined interval into two parts, (342×8) and (8+6). The frequency divider 240 divides the part of (342×8) by 8 (a first number) to generate the CCK as the CCK of FIG. 2. The other part (8+6) is divided by 14 (a second number) to generate a cycle of the CCK having 14 cycles of the PCK, as shown in FIG. 5. Note that when the frequency divider 240 divides the part (8+6) by 14, the first counter 242 counts from 0 to 13 instead of counting from 0 to 7. Therefore, the six cycles of the PCK, the extended clock, can be inserted into a certain cycle of the CCK during the predetermined interval. After the extended clock elapses, the first counter 242 continues counting from 0 to 7 to generate the CCK as the CCK of FIG. 2. In other words, when generating a control signal for each scan line, the first counter 242 of the frequency divider 240 must count from 0 to 13 once (CNT_PCK is from 0 to 13) and count from 0 to 7 for 342 times. When generating another control signal for the next scan line, the first counter 242 repeats counting from 0 to 13 once and from 0 to 7 for 342 times.

Figure 3:
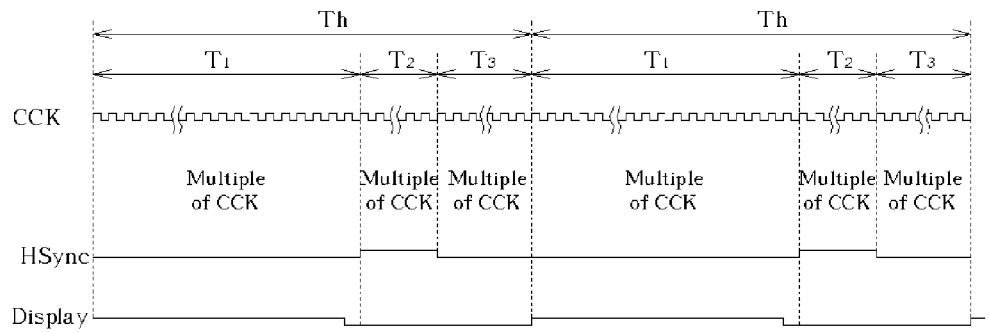
FIG. 3 shows a control signal and the CCK of FIG. 2.
Figure 6:
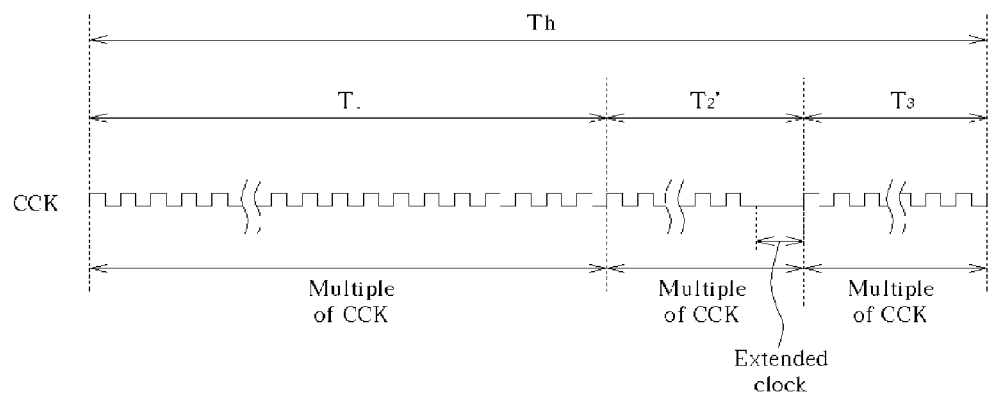
FIG. 6 and FIG. 7 are diagrams of an extended clock inserted into different sections according to the present invention.
Figure 7:
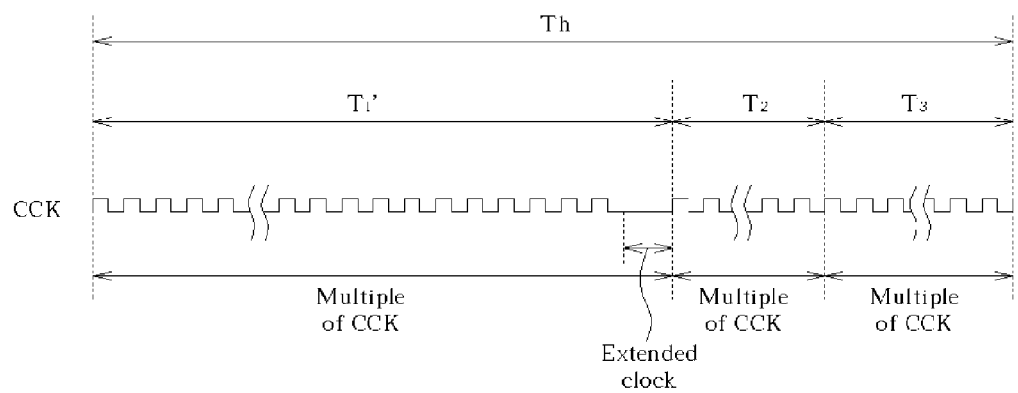

Please refer to FIG. 6 and FIG. 7. The extended clock is inserted into different sections in FIG. 6 and FIG. 7. In FIG. 6, the extended clock is inserted into the last cycle of time T2 of the CCK in FIG. 3. In FIG. 7, the extended clock is inserted into the last cycle of time T1 of the CCK in FIG. 3. Therefore, each duration T1, T2' and T3 of FIG. 6 and each duration T1', T2 and T3 of FIG. 7 is an integer multiple of the CCK. Note that in FIG. 3, the beginning of T1 starts at the time that images are displayed on the screen. In order to ensure that images are correctly displayed on the screen, the extended clock cannot be inserted into the last cycle of the CCK of T3 in FIG. 3. In addition, the six cycles of the PCK of FIG. 5 can be inserted into more than one specific cycle of the CCK. For instance, the first counter 242 of the frequency divider 240 counts from 0 to 9 once, from 0 to 11 once, and from 0 to 7 for 341 times. Or, the first counter 242 counts from 0 to 8 for 6 times and from 0 to 7 for 337 times so as to generate 343 cycles of the CCK.

Compared to the prior art, the present invention divides the PCK during the predetermined interval into one part having the number of cycles evenly divisible by an integer and another part having a number of cycles not evenly divisible by the same integer. The frequency divider generates a complete cycle of the CCK according to the part with the number of cycles not evenly divisible by the integer. Therefore, the present invention can transform the PCK during the predetermined interval into a plurality of complete cycles of the CCK.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A connection device capable of converting a pixel clock to a character clock, the connection device comprising:
    a pixel clock generator for generating a pixel clock having a number of cycles that is not an integer multiple of a first number during a predetermined interval;
    a frequency divider for generating a character clock according to the pixel clock; and
    a logic unit directly connected to the frequency divider for controlling the frequency divider to generate the character clock by dividing the number of cycles of the pixel clock during part of the predetermined interval by the first number, division of the number of cycles of the pixel clock during the predetermined interval by the first number producing a quotient and a remainder, the remainder being equal to a second number of remaining pixel clocks, the logic unit adding one or more extra cycles of the pixel clock to cycles of the character clock during the predetermined interval until the second number of remaining pixel clocks have all been added to cycles of the character clock, wherein the second number is less than the first number and both the first and second numbers are positive integers.

2. The connection device of claim 1 wherein durations of both high and low states of the character clock are multiples of the pixel clock period.

3. The connection device of claim 1 wherein the first number is eight or nine.

4. A method for converting a pixel clock to a character clock, the method comprising:
    providing a pixel clock with a number of cycles that is not an integer multiple of a first number during a predetermined interval;
    dividing the number of cycles of the pixel clock during part of the predetermined interval by the first number, division of the number of cycles of the pixel clock during the predetermined interval by the first number producing a quotient and a remainder, the remainder being equal to a second number of remaining pixel clocks, wherein the second number is less than the first number and both the first and second numbers are positive integers; and the logic unit adding one or more extra cycles of the pixel clock to cycles of the character clock during the predetermined interval until the second number of remaining pixel clocks have all been added to cycles of the character clock.

5. The method of claim 4 wherein durations of both high and low states of the character clock are multiples of the pixel clock period.

6. The method of claim 4 wherein the first number is eight or nine.

* * * * *